Dec. 24, 1968 W. A. VAN DRIL 3,417,983
CUPOLA CONSTRUCTION
Filed Feb. 23, 1966 2 Sheets-Sheet 1

Inventor
William A. Van Dril,
By Truitt, Lockwood Grunawalt & Drury
attys

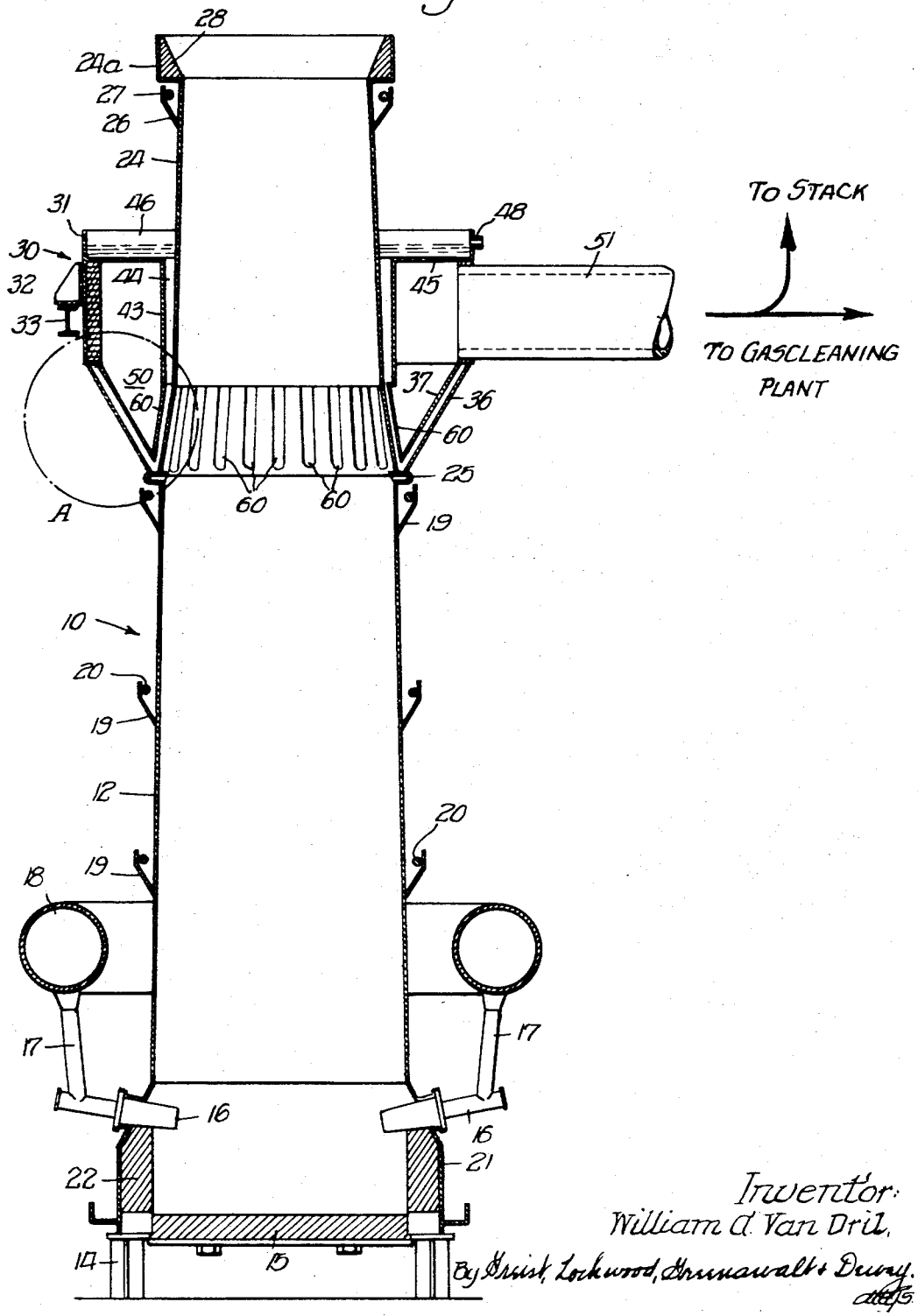

United States Patent Office 3,417,983
Patented Dec. 24, 1968

3,417,983
CUPOLA CONSTRUCTION
William A. Van Dril, Chicago Heights, Ill., assignor to
Whiting Corporation, a corporation of Illinois
Filed Feb. 23, 1966, Ser. No. 529,300
10 Claims. (Cl. 266—31)

ABSTRACT OF THE DISCLOSURE

The cupola consists of upper and lower frusto-conical sections, the lower end of the upper section being in vertical spaced relation from the upper end of the lower section thereby defining an open space in communication with an annular gas take-off section. An apertured barrier connects the lower end of the upper section with the upper end of the lower section. This barrier consists of spaced, axially extending hollow pipes through which cooling water is passed. Preferably, these pipes define an upright frusto-conical section thereby to minimize the possibility of jamming of the charge material.

---

This invention relates in a general way to cupolas, and more particularly the invention relates to new and improved construction for reducing the likelihood of jamming of the charge in a cupola.

The type of cupola to which the subject invention is applicable includes an upright generally cylindrical lower section incorporating tuyeres near its lower extremity for injecting combustion air into a charge containing scrap iron, coke and fluxing material, such as limestone. Near the upper portion of this section is a gas take-off section comprising generally a hollow annular section communicating with the interior of the lower section and with a discharge stack or a gas cleaning apparatus incorporating an induced draft fan for drawing the products of combustion from the charge through the gas take-off section. Superimposed on the gas take-off section is a generally cylindrical charging or upper section having an open top which is adapted to receive charges from suitable means, such as a bucket. The induced draft is regulated in such manner as to draw a small amount of air downwardly or inwardly through the charge in the charging section into the gas take-off section, thereby preventing exhausting the products of combustion through the open top charging section.

One or more portions of the gas take-off section are of double walled construction and serve as jackets or compartments for the passage of cooling water therethrough. The gas take-off section includes a bottom wall of inverted frusto-conical shape, which wall portion joins with the lower section at the upper end thereof. Should any of the charge material enter the gas take-off section through the open space defined by the upper end of the lower section and the lower end of the upper section, such charge material is usually deflected into the lower section by this inclined or frusto-conical wall portion of the gas take-off section.

Notwithstanding the inclined bottom wall portion of the gas take-off section, it is not infrequent when some of the charge material enters the gas take-off section and becomes jammed against this bottom wall, thereby causing a jam in the upper section and/or gas take-off section of the cupola. Sometimes a jam in the upper section can be loosened by dropping a weight into the cupola. If this operation is unsuccessful, it is necessary to shut down the entire cupola for removal of the jam, which shut down of course results in a costly production delay. Even if a jam in the upper section is only temporary and is easily released, such a jam may plug the upper end of the cupola thereby developing a substantial void beneath the plug. When the jam is finally released, the plug of material causing the jam drops into the lower section very quickly resulting in rapid fluctuations in pressure in the cupola. These sudden pressure changes and the abrupt loss of all or a substantial portion of the charge material in the upper section constitutes potentially dangerous conditions. The present invention has to do with new and improved means for preventing charge material of any substantial size from entering the gas take-off section thereby making unlikely the formation of a jam in the cupola.

A primary object of the present invention is the provision of a new and improved cupola construction for reducing the likelihood of a jam forming in the cupola without impairing the efficiency of the cupola operation in any way.

Another object of the present invention is the provision of apertured barrier means in a cupola for preventing charge material of substantial size from entering the gas take-off section of the cupola, thereby to reduce the possibility of a jam forming in or adjacent the gas take-off section of the cupola.

Still another object of the present invention is the provision of barrier means according to the preceding paragraph, wherein such tubular members serve as conduits of equally spaced tubular members arranged in a frustoconical formation between the lower end of the upper section and the upper end of the lower section of the cupola.

Another object of the present invention is the provision of an upright generally cylindrical formation constituting an apertured barrier separating the gas take-off section from the open space between the upper and lower cupola sections, wherein such formation and the upper cupola section have lower end diameters not less than their respective upper end diameters.

Another object of the present invention is the provision of barrier means according to the preceding paragraph, wherein such tubular members serve as conduits for cooling water.

These and other objects and advantages of the invention will become apparent from the following specification disclosing a preferred embodiment of the invention which is illustrated in the accompanying drawings wherein:

FIG. 2 is an enlarged vertical central section of the cupola taken along the line 2—2 of FIG. 1.

Figure 1:
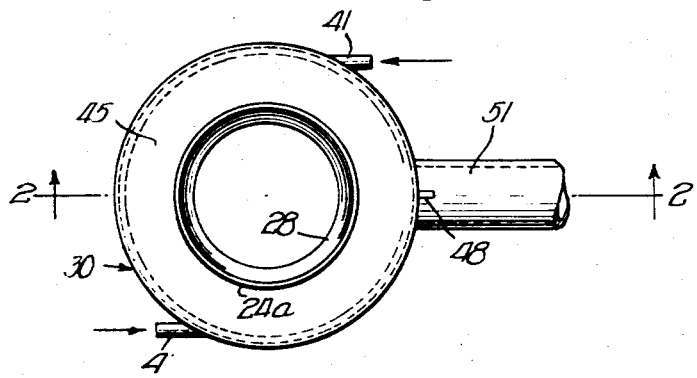
FIG. 1 is a top plan view of a cupola incorporating one embodiment of the present invention.

Referring to the drawings, the cupola 10 will be seen to include an upright, generally cylindrical lower section or shell 12 supported at the lower end thereof by a base structure 14. Lower section 12 includes bottom doors 15 having a lining of refractory material which define the bottom of the cupola when the doors are closed as shown in FIG. 2. Combustion of the fuel (coke) in the charge is accomplished by injecting combustion air under pressure through a number of circumferentially spaced tuyeres 16, which tuyeres are in communication with respective conduits 17. The conduits 17 open into a toroidal-shaped manifold 18 into which a supply of air is admitted. Lower section 12 includes a number of brackets 19 supporting a plurality of spray pipes 20, which pipes encircle the lower section at intervals along the length thereof for continuously forming a film of cooling water on the outside of the lower section during operation of the cupola. The lower section includes an enlarged base portion 21 in which a lining of refractory materal 22 is contained. The refractory lining 22 and the refractory layer on the door 15 together form a container for molten metal, slag and the incandescent coke bed.

The cupola 10 further includes an upright, generally cylindrical upper or charging section or shell 24 which is mounted in coaxial relation with lower section 12. It will be noted that both upper section 24 and lower section 12 are actually frusto-conical in shape. The frusto-conical shape of these two sections facilitates downward movement of the charge material. The lower end of upper section 24 is in vertical spaced relation with the upper end of lower section 12, which upper end supports an annular expansion joint 25. It will further be noted that the diameter of the upper section 24 at the lower end thereof is slightly less than the diameter of the lower section 12 at the upper end thereof. Upper section 24 includes a number of brackets 26 supporting a spray pipe 27 surrounding the upper section adjacent the upper end thereof, thereby to form a film of cooling water over the outside of this section during operation of the cupola. Upper section 24 includes an enlarged portion 24a at the upper end thereof, which portion supports an annular member 28 formed of heat and abrasion resistant material, such as cast iron. The upper end of the upper section serves as the mouth of the cupola; the cupola is charged or loaded through this mouth.

Figure 3:
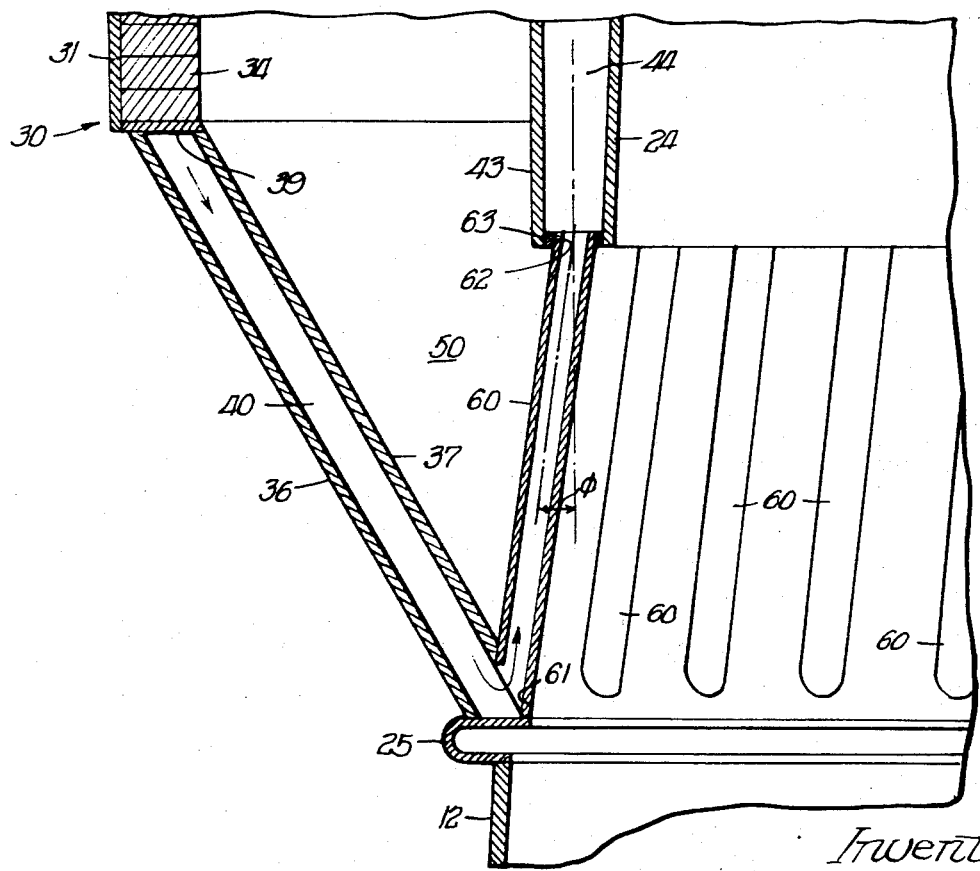
FIG. 3 is an enlarged view of the portion of the cupola within the circle A of FIG. 2.

A gas take-off section, generally designated 30, includes an outer cylindrical wall 31, which wall is supported from a number of bracket plates 32, such bracket plates being in turn supported by structural framework 33. A portion of the wall 31 is lined with refractory blocks 34. The gas take-off section 30 further includes a bottom portion defined of spaced, inverted frusto-conical shaped walls 36, 37. As best seen in FIG. 3, the plates 36, 37 are connected at their lower edges to the expansion joint 25. These two plates are connected at their upper edges to an annular plate 39, which plate supports the refractory material 34. The spaced plates 36, 37 define a frusto-conical shaped water-receiving space or jacket 40. Cooling water is admitted to this space through tangentially arranged inlets 41 (FIG. 1).

The gas take-off section 30 is further defined by an inner cylindrical plate 43 surrounding the lower portion of the upper section 24 in spaced relation therewith. Plate 43 and the lower portion of shell 24 define an annular water-receiving space 44. Gas take-off section 30 also includes an annular plate 45 extending between plate 43 and plate 31. Plate 45 defines the base or bottom of a pan 46 which is open to atmosphere. It will be noted that the annular water-receiving space 44 opens into the pan 46. A radially extending discharge conduit 48 permits the escape of water from the pan 46; this conduit is connected to suitable drain conduits (not shown).

It will be seen that the gas take-off section 30 defines an annular chamber 50 communicating with the open area between the lower end of upper section 24 and the upper end of lower section 12. A conduit 51 is in communication with the chamber 50; this conduit communicates with a bleeder stack and a suitable gas cleaning plant (not shown).

It will be understood that the gases of combustion are drawn into the chamber 50 either by a stack or a fan associated with the gas cleaning plant. The stack or fan, as the case may be, induces a slight downdraft through upper section 24 to prevent exhausting the products of combustion through the open top of the cupola.

The cupola thus far described, with the exception of the shape of upper section 24, is of known construction and of itself forms no part of the present invention. In this type of prior art cupola, the upper or charging section thereof is of inverted frusto-conical shape for funneling the downwardly moving charge. One feature of the present invention resides in providing the upper section with an improved shape which contributes to preventing jamming in the upper section. In the prior art type of cupola just described, suitable conduit means (not shown) are provided for discharging cooling water from the frusto-conical water-receiving space 40 and for admitting cooling water to the annular water-receiving space 44. This known type of cupola is completely open between the lower end of the upper section 24 and the upper end of the lower section 12. In using such a cupola, the charge material sometimes enters the chamber 50 of the gas take-off section through this open area and becomes wedged or jammed against the wall 37 notwithstanding the fact that the latter is downwardly and inwardly inclined. Jamming of the charge in this area of the cupola causes the various problems outlined above. The present invention also has to do with new and improved means which constitute an apertured barrier for preventing charge material, at least charge material of substantial size, from entering the chamber 50 of the gas take-off section 30.

To this end, a number of equally spaced tubes 60 are provided. Each tube 60 extends through an aperture 61 (FIG. 3) formed in wall 37 thereby placing each tube 60 in communication with frusto-conical water-receiving space 40. Each tube 60 extends through an opening 62 of an annular plate 63, which plate 63 defines the bottom of annular water-receiving space 44. Thus, each tube 60 is also in communication with water-receiving space 44.

The spaces or apertures between the tubes 60 permit the gases of combustion to pass from the interior of the cupola to the chamber 50 for passage to the gas cleaning plant or stack. However, the spacing between the tubes 60 is such that charge materials of any substantial size cannot pass between the tubes and possibly jam against the wall 37 of the gas take-off section. Thus, the tubes 60 form an apertured barrier between annular chamber 50 and the open space between adjacent ends of cupola sections 12 and 24.

According to the present invention, upper section 24 is either of upright frusto-conical shape or upright cylindrical shape to minimize the possibility of jamming in the charging section itself. The diameter of upper section 24 should be as large as possible to accommodate maximum size charge material, but the diameter of the upper section at the lower end thereof should not exceed the diameter of the lower section at its upper end, otherwise the problem of jamming in the area adjacent the gas take-off section would obviously be aggravated. A desirable cupola design provides that the diameter of upper section 24 at the lower end thereof is slightly less than the diameter of lower section 12 at its upper end, thereby resulting in an upright frusto-conical arrangement of the tubes 60 which extend between the lower end of upper section 24 and the upper end of lower section 12. The frusto-conical arrangement of the tubes 60 tends to prevent charge material from jamming between the tubes themselves. In other words, the downwardly diverging arrangement of the tubes tends to prevent a piece of charge material from wedging between a pair of adjacent tubes as the charge works downwardly during operation of the cupola.

Although an upright frusto-conical arrangement of the tubes 60 is preferred, should the cupola have the lower end diameter of the upper section the same as the diameter of the lower section at its upper end, these tubes could be arranged to define an upright cylindrical cage or barrier, i.e., each tube 60 would be vertical, without materially reducing the effectiveness of the tubes in preventing jamming of the charge material. On the other hand, in either form of cupola just mentioned, an inclination of the tubes 60 in excess of 20° reduces the effectiveness of the tubes in preventing jamming as such an inclined arrangement of the tubes would expose a considerable portion of the wall 37 to the charge material. In order for the tubes 60 to perform satisfactorily, the range of inclination thereof from the vertical, indicated by the angle $\phi$ in FIG. 3, is between 0° and 20° with a preferred angle being between 5° to 10°.

The tubes 60 also serve as a means for placing water-receiving space 40 in communication with water-receiving space 44, thereby obviating the separate conduits mentioned above for discharging water from space 40 and for admitting water to space 44. The cooling water admitted through the tangentially arranged inlets 41 swirls downwardly in the frusto-conical water-receiving space 40. The water is then forced upwardly through the tubes 60; the water becomes heated in the tubes 60 thereby facilitating rising of the water to the annular water-receiving space 44. The upwardly flowing cooling water then flows into the pan 46 for discharge through the conduit 48.

The total area of the spaces or apertures between the tubes 60 is more than adequate to permit escape of the gases of combustion at the desired rate. In a preferred embodiment of the invention, the total area of the spaces between the tubes 60 is not less than the cross-sectional area of the lower section 12 at the upper end thereof.

While the invention has been shown in but one form, it will be obvious to those skilled in the art that it is not to be so limited. On the contrary, the invention is susceptible of various forms and modifications without departing from the spirit and scope of the appended claims. In this respect, unless specifically defined the term "generally cylindrical" as used in the following claims includes cupola sections which are truly cylindrical as well as sections which are slightly upright frusto-conical in shape, such as cupola sections 12 and 24.

I claim:

1. In a cupola of the type including an upright generally cylindrical lower section, an upright generally cylindrical upper section mounted above said lower section with the lower end of the former in vertical spaced relation with the upper end of the latter thereby defining an annular open space between said sections, wherein said upper section is adapted to receive charge material and wherein the inside diameter of said lower end is not in excess of the inside diameter of said upper end, a gas take-off section defining an annular chamber having an inner portion conterminous and in communication with said open space, draft inducing means in communication with said gas take-off section, the improvement comprising, a plurality of spaced, axially extending members defining an upright generally cylindrical formation constituting an apertured barrier between said annular chamber and said open space, which formation connects the lower end of said upper section with the upper end of said lower section, the apertures in said barrier serving to permit the escape of gases to said chamber and to prevent the entry into said chamber of charge material of substantial size, the lower end diameters of said upper section and said cylindrical formation being not less than respective upper end diameters thereof.

2. The improvement according to claim 1 wherein said barrier means comprises a plurality of spaced, hollow elongated members defining apertures therebetween.

3. The improvement according to claim 2 wherein said hollow elongated members are adapted to contain cooling water.

4. The improvement according to claim 1 wherein the total area of the apertures in said barrier means is not less than the cross-sectional area of said lower section at said upper end thereof.

5. The improvement according to claim 1 wherein the diameter of said lower end of the upper section is less than the diameter of said upper end of the lower section, and wherein said barrier means is a frusto-conical formation defined by a plurality of spaced, hollow elongated members each forming an element of said formation, such members defining apertures therebetween.

6. The improvement according to claim 5 wherein each member defines an angle with the vertical not in excess of 20°.

7. In a cupola of the type including an upright generally cylindrical lower section, an upright generally cylindrical upper section mounted above said lower section with the lower end of the former in vertical spaced relation with the upper end of the latter thereby defining an open space between said sections, wherein said upper section is adapted to receive charge materials and wherein the diameter of said lower end is not in excess of the diameter of said upper end, a gas take-off section defining an annular chamber having an inner portion conterminous and in communication with said open space, a generally cylindrical wall within said chamber, which wall surrounds said upper section adjacent the lower end thereof and defines an annular water-receiving space, means for discharging water from said space, said gas take-off section including a portion defined by parallel, spaced walls each of inverted frusto-conical shape joining said lower section at the upper end thereof, which walls define a frusto-conical water-receiving space, means for admitting cooling water to said last mentioned space, draft inducing means in communication with said gas take-off section, the improvement comprising, means defining an upright generally cylindrical formation constituting an apertured barrier between said annular chamber and said open space, said barrier means consisting of a plurality of spaced tubes each being in communication at its respective opposite ends with said annular water-receiving space and said frusto-conical water-receiving space thereby to permit passage of cooling water from the latter to the former, said tubes defining open spaces serving to permit the escape of gases to said chamber and to prevent the entry into said chamber of charge material of substantial size, the lower end diameters of said upper section and said cylindrical formation being not less than respective upper end diameters thereof.

8. The improvement according to claim 7 wherein the diameter of said lower end of the upper section is less than the diameter of said upper end of the lower section, and wherein said barrier means defines a frusto-conical formation with each tube lying on an element of such formation.

9. The improvement according to claim 8 wherein each tube defines an angle with the vertical not in excess of 20°.

10. The improvement according to claim 7 wherein the total area of the spaces between said tubes is not less than the cross-sectional area of said lower section at said upper end thereof.

References Cited

UNITED STATES PATENTS

| | | | |
|---|---|---|---|
| 123,035 | 1/1872 | McKernan | 266—31 |
| 2,338,175 | 1/1944 | Gibson | 266—17 |
| 2,688,478 | 9/1954 | Lykken | 266—32 |
| 2,824,731 | 2/1958 | Schwengel | 266—32 |

J. SPENCER OVERHOLSER, *Primary Examiner.*

R. D. BALDWIN, *Assistant Examiner.*

U.S. Cl. X.R.

266—32